(12) United States Patent
Harji

(10) Patent No.: US 10,065,162 B2
(45) Date of Patent: Sep. 4, 2018

(54) HEATING AND COOLING APPARATUS

(71) Applicant: Cambridge Reactor Design Ltd, Cambridgeshire (GB)

(72) Inventor: Bashir Harji, Cambridgeshire (GB)

(73) Assignee: Cambridge Reactor Design Ltd, Cambridgeshire (GB)

( * ) Notice: Subject to any disclaimer, the term of this patent is extended or adjusted under 35 U.S.C. 154(b) by 484 days.

(21) Appl. No.: 14/353,501

(22) PCT Filed: Oct. 23, 2012

(86) PCT No.: PCT/GB2012/052623
§ 371 (c)(1),
(2) Date: Apr. 23, 2014

(87) PCT Pub. No.: WO2013/061043
PCT Pub. Date: May 2, 2013

(65) Prior Publication Data
US 2014/0290927 A1    Oct. 2, 2014

(30) Foreign Application Priority Data

Oct. 24, 2011    (GB) .................................. 1118339.9
Nov. 25, 2011    (GB) .................................. 1120379.1

(51) Int. Cl.
*B01F 15/06*    (2006.01)
*B01F 13/08*    (2006.01)
(Continued)

(52) U.S. Cl.
CPC ............ *B01F 15/065* (2013.01); *B01F 13/08* (2013.01); *B01F 15/06* (2013.01); *B01L 7/52* (2013.01);
(Continued)

(58) Field of Classification Search
CPC ............... F25B 2400/01; F25B 29/003; G01R 31/2865; B01F 15/065; B01F 15/06;
(Continued)

(56) References Cited

U.S. PATENT DOCUMENTS 3,333,829 A * 8/1967 Moore ................ B01F 13/0818
165/46
4,913,985 A * 4/1990 Baer ................ H01M 10/6568
429/120
(Continued)

FOREIGN PATENT DOCUMENTS

WO    02/097342    12/2002
WO    2007106823    9/2007

*Primary Examiner* — Devon Russell
(74) *Attorney, Agent, or Firm* — Fleit Gibbons Gutman Bongini Bianco PL; Jose Gutman

(57) ABSTRACT

A heating/cooling plate device for heating and/or cooling an object through a range of operating temperatures extending both above and below ambient. The device having a heating element to heat the plate, and a vapor compression refrigeration system through which refrigerant flows to cool the plate. Greater control of the heating and cooling of the plate is achieved by positioning the heater element substantially at the exit of an expansion valve of the evaporation compression system as this provides thermal energy to the refrigerant as it enters the evaporator.

10 Claims, 7 Drawing Sheets

(51) Int. Cl.
  *B01L 7/00*   (2006.01)
  *F25B 49/02*  (2006.01)
  *F25B 29/00*  (2006.01)
  *F25B 41/00*  (2006.01)
  *F28D 21/00*  (2006.01)
  *G05D 23/19*  (2006.01)

(52) U.S. Cl.
  CPC ............ *F25B 29/003* (2013.01); *F25B 41/00* (2013.01); *F25B 49/02* (2013.01); *B01L 2300/1827* (2013.01); *B01L 2300/1894* (2013.01); *B01L 2400/082* (2013.01); *F25B 2400/13* (2013.01); *F25B 2700/2117* (2013.01); *F28D 2021/0052* (2013.01); *G05D 23/19* (2013.01)

(58) Field of Classification Search
  CPC .......... B01F 2015/061; B01F 2015/062; B01F 13/08; F28D 2021/0052
  USPC ................................... 165/254, 61, 260, 101
  See application file for complete search history.

(56) References Cited

U.S. PATENT DOCUMENTS

| | | | | |
|---|---|---|---|---|
| 5,316,872 A * | 5/1994 | Baer | ........................ | F28D 15/00 429/62 |
| 5,529,391 A * | 6/1996 | Kindman | ............ | B01F 13/0818 366/145 |
| 5,977,785 A * | 11/1999 | Burward-Hoy | ....... | F28D 9/0093 165/201 |
| 6,012,383 A * | 1/2000 | Lande' | ..................... | A23G 9/12 366/146 |
| 6,184,504 B1 * | 2/2001 | Cardella | ............ | G01R 31/2862 219/209 |
| 6,324,857 B1 * | 12/2001 | Hofling | .................... | B01L 7/02 62/202 |
| 6,533,838 B1 * | 3/2003 | Yamamura | ................ | C22B 9/02 75/688 |
| 6,668,570 B2 * | 12/2003 | Wall | ................... | G01R 31/2874 165/255 |
| 6,723,964 B2 * | 4/2004 | Hwang | ............. | H01L 21/67109 219/390 |
| 6,736,206 B2 * | 5/2004 | Hisai | ................. | H01L 21/67109 118/724 |
| 6,802,368 B2 * | 10/2004 | Getchel | ................ | B23Q 11/126 165/101 |
| 6,938,432 B2 * | 9/2005 | Enomoto | ................ | F25B 40/00 62/217 |
| 7,100,389 B1 * | 9/2006 | Wayburn | ........... | G01R 31/2874 324/750.08 |
| 7,199,597 B2 * | 4/2007 | Tustaniwskyj | ..... | G01R 31/2874 165/80.3 |
| 7,819,179 B2 * | 10/2010 | Hayashi | .................. | F25B 41/04 165/260 |
| 8,151,872 B2 * | 4/2012 | Di Stefano | ............. | F25B 49/02 165/101 |
| 8,272,230 B2 * | 9/2012 | Nakamura | ................ | G06F 1/20 257/715 |
| 8,424,594 B2 * | 4/2013 | Canfield | ............ | G01R 31/2891 165/185 |
| 8,844,612 B2 * | 9/2014 | Tani | .................... | G01R 31/2874 165/103 |
| 8,955,579 B2 * | 2/2015 | Tandou | .................... | F25B 39/02 118/724 |
| 9,485,810 B2 * | 11/2016 | Imai | ..................... | H05B 1/0269 |
| 2003/0000224 A1 * | 1/2003 | Kriz | .................... | B01F 13/0818 62/3.7 |
| 2003/0128626 A1 * | 7/2003 | Verkerk | ............. | B01F 13/0818 366/140 |
| 2007/0240870 A1 * | 10/2007 | Hayashi | ................. | F25B 41/04 165/253 |
| 2008/0003649 A1 | 1/2008 | Maltezos et al. | | |
| 2008/0013400 A1 * | 1/2008 | Andrews | .............. | B01F 13/0818 366/147 |
| 2009/0022625 A1 | 1/2009 | Lee et al. | | |
| 2009/0116333 A1 * | 5/2009 | Lu | .............................. | B01D 3/02 366/145 |
| 2011/0229734 A1 * | 9/2011 | Cheung | ................. | B32B 15/018 428/670 |
| 2012/0090337 A1 * | 4/2012 | Chen | ...................... | F25B 30/02 62/79 |
| 2016/0151751 A1 * | 6/2016 | Eble | .................... | B01F 13/0818 366/146 |

\* cited by examiner

HEATING AND COOLING APPARATUS

BACKGROUND

The present invention relates to heating and cooling apparatus, and in particular but not exclusively to bench top heating and cooling plates and columns on which an object to be heated or cooled is supported thereon.

There are a number of commercial products available that can provide hot and cold operating conditions. These generally fall into two categories. The first category use Peltier elements. These electric elements are inefficient and use a lot of electricity.

In addition to being expensive to run, Peltier device based coolers are usually bulky as it is necessary to house the large, low voltage, high current units to supply the power required for the Peltier elements. Some Peltier devices also require water cooling.

Oil circulators form the second category of heater/coolers. They are bulky, have slow response times, and require pipe connections to the object being either heated or cooled. The response time can be improved by using powerful refrigeration systems though these are expensive.

U.S. Pat. No. 6,324,857 relates to a temperature controlled bath with both heating and cooling elements (20, 8) submerged within the bath fluid (3). Control of the cooling function is achieved by regulating an expansion valve (7) which controls refrigerant flow through the cooling element (8). The expansion valve is connected to a control line (9) containing a liquid. Regulation of the expansion valve is achieved by varying the temperature of the liquid within the control line using a heater (13) and refrigerant. The refrigerant is either passed through the cooling element (8) or has been introduced via a bypass line (16) downstream of the cooling element. The resulting contraction or expansion of the fluid acts to open or close the expansion valve.

U.S. Pat. No. 6,938,432 relates to a cooling apparatus in which the degree of cooling is achieved by regulating a valve (10). The evaporator maybe incorporated into a plate (15) provided with a temperature sensor (22) linked to the regulating valve (10). The refrigerant flow into the cooling element is also regulated by a further valve (5) to ensure that the refrigerant remains as a gas liquid mixture whilst in and downstream of the evaporator. This is to ensure that the temperature of the refrigerant is uniform throughout the evaporator so there is no variation of temperature across the plate. The apparatus is provided with a heater (11) downstream of the evaporator to ensure all refrigerant is in the gas phase before it reaches the compressor (2). The plate is provided with a separate heater (19) used to warm and dry the plate after a cycle of operation.

BRIEF SUMMARY

According to various embodiments of the present invention, an efficient, fast thermal response device is provided and which could act to heat and/or cool an object through a wide range of operating temperatures (e.g. 250 degrees centigrade down to −150 degrees centigrade) extending both above and below ambient, and in particular to provide precise temperature control of an object at sub ambient temperatures.

According to various embodiments of the invention there is provided a heating and cooling apparatus comprising: a body providing a surface for supporting an object to be heated or cooled on a first side of the body; heater having a heating element to heat the surface; a vapor compression refrigeration system comprising an evaporator through which a refrigerant flows to cool the surface; at least one temperature sensor to sense the temperature of the surface and/or the object, and the temperature of at least one of the heating element and the evaporator, and to output signals indicative of these temperatures; a controller to receive the output signals and in response thereto to control operation of the heater and refrigeration system together in order to control the temperature of the surface; and wherein the heater and evaporator are located on an opposite side of the body to the object to be heated or cooled, the heater and evaporator being in direct contact with the body.

According to various embodiments of the invention, there is provided heating and cooling apparatus comprising: a surface for supporting an object to be heated or cooled; a heater having a heating element to heat the surface; a vapor compression refrigeration system comprising an evaporator through which a refrigerant flows to cool the surface; at least one temperature sensor to sense the temperature of the surface and/or the object, and the temperature of at least one of the heating element and the evaporator, and to output signals indicative of these temperatures; a controller to receive the output signals and in response thereto to control operation of the heater and refrigeration system together in order to control the temperature of the surface; and wherein the heater element is positioned substantially at the exit of a capillary/expansion valve forming part of the vapor compression refrigeration system to provide thermal energy to the refrigerant as it enters the evaporator.

Various embodiments of the invention provide convenience as the surface, which may take the form of a plate, can be used directly to support an object and control its temperature precisely through a wide range of temperatures without the need for complex oil baths/circulator connections and the like.

Use of various embodiments enables a device which is compact in size compared to a Peltier device or an oil circulator.

The use of a plate additionally allows other sensing equipment to be easily incorporated allowing the user to measure the influence of temperature to other physical properties of the object.

In a preferred embodiment, the controller is capable of operating both the compressor and the heating element simultaneously, though a similar benefit may be achieved by switching between the two in quick succession.

In order to achieve a target temperature, the controller typically measures the actual temperature of the surface and the change in rate of the actual temperature, and in response adjusts the power to the heater and cooling system.

The above measurements alone make it hard to provide precise control of the actual temperature of the surface or rate of change of surface temperature because a change in the power provided to either the heater and cooling system does not necessarily produce a proportional response.

By sensing the temperature of both the surface/object, and the heating element/evaporator, more accurate control of the temperature of the surface/object can be achieved. In the most preferred embodiment, the temperature of both the heating element and evaporator are measured.

It is preferred that a thermally conducting path exists between the surface, heating element and evaporator. When thermal energy is transferred between these elements primarily through conduction, thermal energy is transferred more quickly, leading to a faster response time as compared with using an immediate fluid to transfer heat between the heating element/evaporator and the object.

A consequence of a faster response time is better control of monitoring processes which require a change in the rate of heating or cooling. Experimentation has indicated that an example apparatus according to the invention is able to provide control within 0.1 degree C. over a wide a range of temperatures both above and below ambient.

Examples of processes where the rate is critically important include: solubility, crystallization, surface diffusion, gas absorption and chemical reaction processes.

The thermally conducting path may be provided through a bridging medium comprising a material having a high thermal conductivity, e.g. of copper or aluminum. For example in one embodiment this bridge could be provided by a casing—housing the heater element and evaporator and defining the surface. Alternatively at least two of the heater, the evaporator and the surface are in direct physical contact with one another, and favorably that the third is in direct physical contact with at least one of the other two. It is most preferred that each of the evaporator, heating element and surface are in contact with the other two. This ensures that thermal energy between all three is transferred as quickly as possible.

It has hitherto been difficult to accurately control the temperature of a plate at sub ambient temperatures because the refrigerant provides a large and instantaneously cooling impact.

This problem has been ameliorated by positioning the heating element to provide thermal energy to the refrigerant flowing through an upstream portion of the evaporator, adjacent the entrance of the evaporator, i.e. the exit of the expansion valve where evaporation first takes place. In this way the heat from the heating element can be used to quickly offset the cooling generated by the evaporated refrigerant.

It is preferred that the controller and associated circuitry be arranged and configured to vary the speed of a compressor forming part of the vapor compression refrigeration system in order to control the flow of the refrigerant through the evaporator. This may be achieved by providing a compressor powered by a direct current source, and that the controller can vary the current to the compressor to control its speed. This is advantageous over a system in which the compressor is either in an off or on state, and switched between these states as it provides greater control over the rate of flow of refrigerant, and thus control of the cooling effect of the system. This is because there is usually a significant time lag between turning a compressor on and it being effective at pumping refrigerant around the cooling system.

In a preferred embodiment the apparatus comprises a heating/cooling plate, the surface being defined by the plate. In an alternative preferred embodiment, the surface is defined by a column. Where the surface is defined by a column, the apparatus may comprise a further heater arranged substantially at one end of the column, and controlled by the controller in order to provide a temperature gradient across the length of the column.

In certain preferred embodiments, the apparatus may further comprise a rotatable magnetic stirring mechanism which can be used when the object to be heated includes a liquid. Typically this would be housed under the surface and operable with a magnetized or magnetizable stirring element placed within the liquid.

Expected uses for various embodiments of the invention include but are not limited to: chemical, medical, food and technology sectors.

BRIEF DESCRIPTION OF THE DRAWINGS

The invention is described by way of example with reference to the following figures in which.

DETAILED DESCRIPTION

Figure 1:
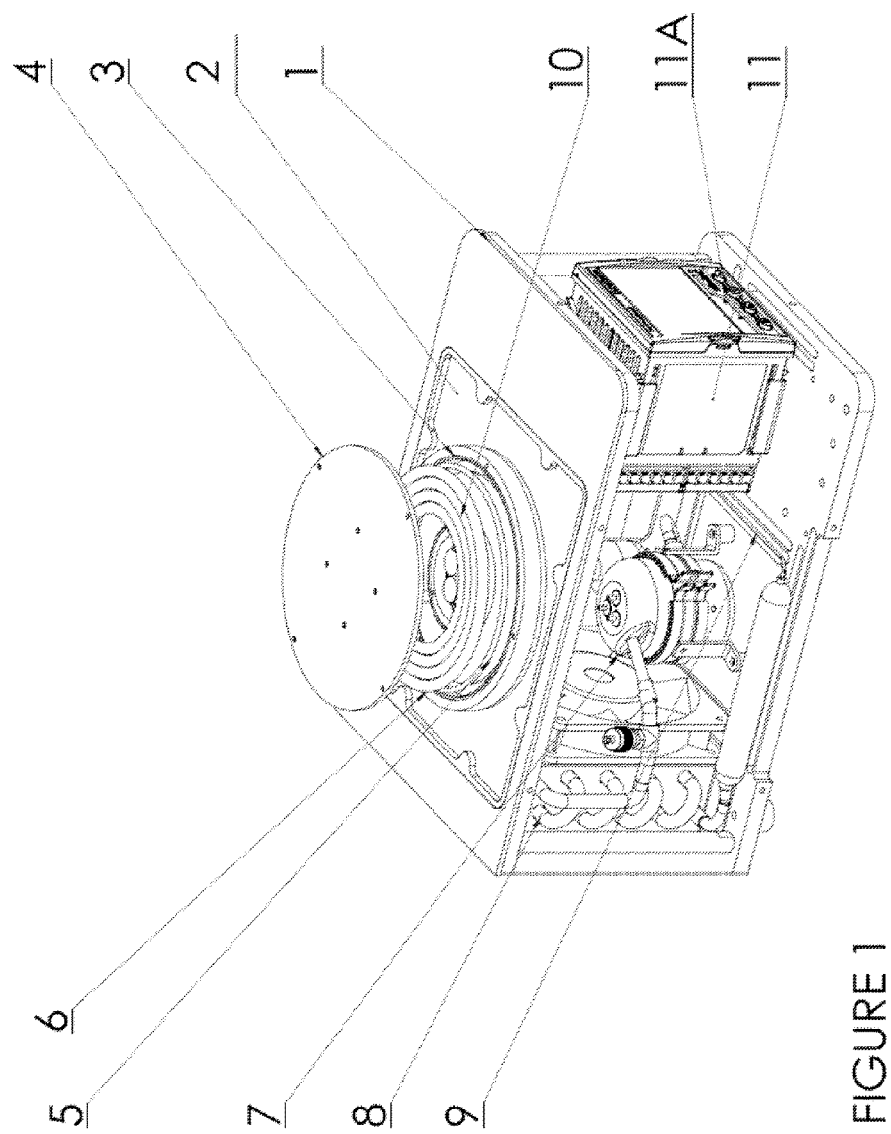
FIG. 1 is a part exploded perspective view of a heating and cooling plate.
Figure 2:
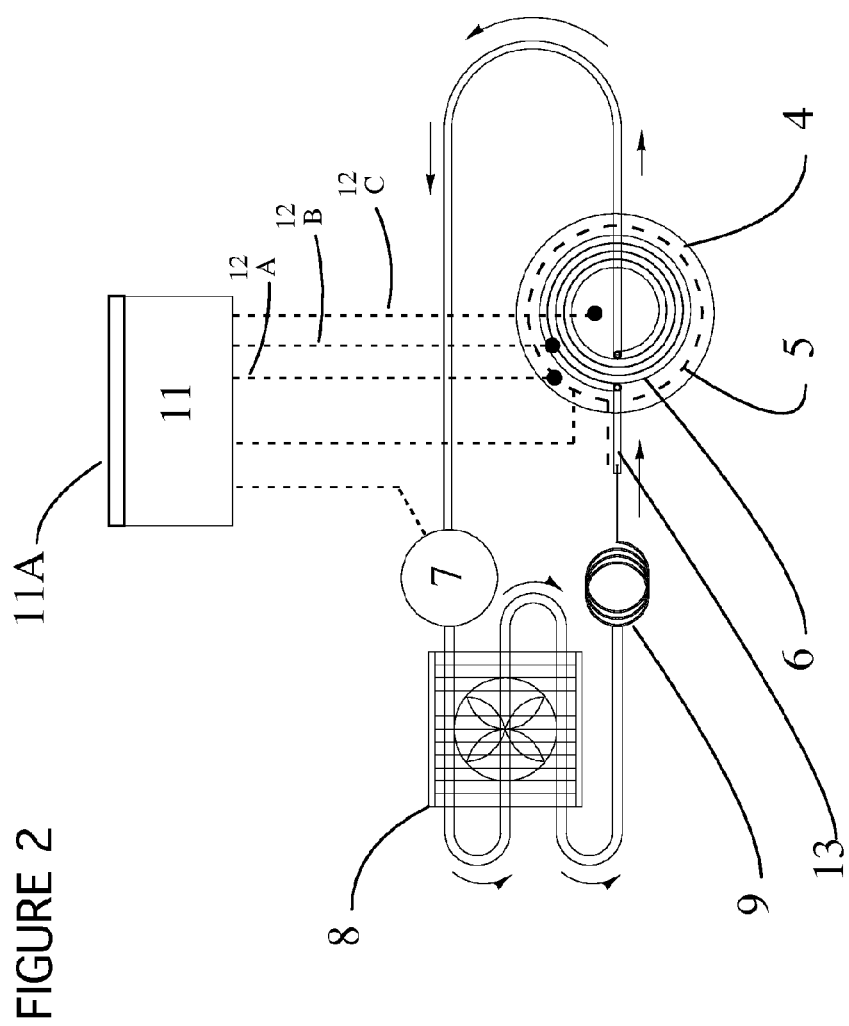
FIG. 2 is a schematic of the heating and cooling plate of FIG. 1.

Referring to FIGS. 1 and 2, there is shown a heating and cooling plate comprising a housing 1, an insulation plate 2, a cylinder 3 which supports a plate 4 onto which an object (e.g. a beaker of liquid) to be heated or cooled can be placed. The plate 4 comprises a material with high thermal conductivity such as copper or aluminum. Within the cylinder 3, and directly below the plate 4, is an electrical heating element 5 and a refrigeration coil 6. The refrigeration element 6 is arranged to be in direct physical contact with the heating element 5. The refrigeration element is formed as a coil nested in a space formed within the arcuate heating element 5. The heating element 5 and refrigeration coil 6 are positioned such that the heating element 5 runs substantially alongside the outermost coil 6, so that they are in direct physical contact. The refrigeration element 6 and heating element 5 are arranged within the cylinder 3 such that when the plate 4 is mounted onto the cylinder 3 it is substantially in physical contact with both the refrigeration coil 6 and heating element 5.

The refrigeration coil 6 forms part of a closed vapor compression refrigeration system which also comprises a compressor 7 for compressing gaseous refrigerant flowing from the refrigeration coil 6, a condenser 8 for condensing compressed refrigerant from the compressor 7, a capillary 9 for controlling the flow of liquid refrigerant into the wider refrigeration coil 6. Refrigerant entering the coil 6 evaporates (fully or partially) before flowing back to the compressor 7. The evaporation of the refrigerant provides the cooling effect of the cooling coil 6.

More precise control of the temperature of the plate is found when the heating element is arranged to heat the refrigerant as it flows through an upstream portion of the cooling coil and in particular at or near the exit of the capillary.

Purposeful direct heating of the refrigerant allows the temperature of the plate 4 to be more precisely controlled, in particular it allows more precise control of the heating and cooling of plate 4 through temperatures including those below ambient over a refrigeration system alone.

An example of a suitable compressor 7 is a rolling piston rotary gas compressor or a miniature rotary compressor as provided by Aspen Compressor, LLC. The compressor 7 is powered by direct current. Its speed is controlled by a control unit 11 (see below) by varying the magnitude of the direct current supplied to it. This is used to vary the flow rate of refrigerant through the system and thus control the cooling power of the refrigeration system.

Also within cylinder 3 there is provided a rotatable magnet means 10 for use as part of a magnetic stirrer. In the current example, this rotatable magnetic means 10 comprises an electro-magnet coil that is rotatable by a moving mechanism (not shown) around a center axis of the electromagnet coil's main coil opening. The rotatable magnetic means 10 is located below the plate 4, at the center of the cooling coil 6.

The apparatus further comprises a control unit 11 (shown schematically in FIG. 3) comprising a processor/controller and associated circuitry. An example of a suitable unit is the Eurotherm Nanodac Recorder/Controller supplied by Eurotherm Ltd (UK). The control unit 11 typically also includes a user interface 11A in order that the control unit 11 can be programmed with conditions for heating/cooling operations, examples of input data may include the target temperature (s), time to hold at a target temperature, and the rate of temperature change (gradients between target temperatures).

The apparatus also includes a temperature sensor 12A for sensing the temperature of the heating element 5; a temperature sensor 12B for sensing the temperature of the cooling element 6; and a temperature sensor 12C for sensing the temperature of the plate 4. Temperature sensors 12A, 12B and 12C, which may be resistance thermometers, produce output signals indicative of the respective temperatures measured; these outputs are received by the control unit 11.

The control unit 11 is programmed, using techniques familiar to persons skilled in the art, e.g. PID or CASCADE, to control the temperature of the plate 4 in view of specific conditions of a heating/cooling operation and in response to the output signals received from the temperature sensors 12A, 12B.

The control 11 can use one or more of a number of operating methods. In one method the control unit 11 can vary the current through the heating element 5 only, to increase or decrease the thermal energy provided by it. In a second method, it can vary the current to the compressor 7 only, in order to vary the cooling power of the refrigeration element 6. In a third method it controls the current to both the heater element 5 and the compressor 7 together which may preferably be simultaneous. This latter method is particularly effective where it is wished to vary the temperature of the plate precisely or to gradient the temperature of the plate 4 with time. Because a thermally conductive path exists between each of the heating element 5, cooling element 6 and plate 4, thermal energy is transferred to/from the plate very quickly. And because the heating element is located adjacent the exit of the capillary 9, any change in the latent heat from the evaporating refrigerant can, if needed, be offset very quickly.

Figure 3:
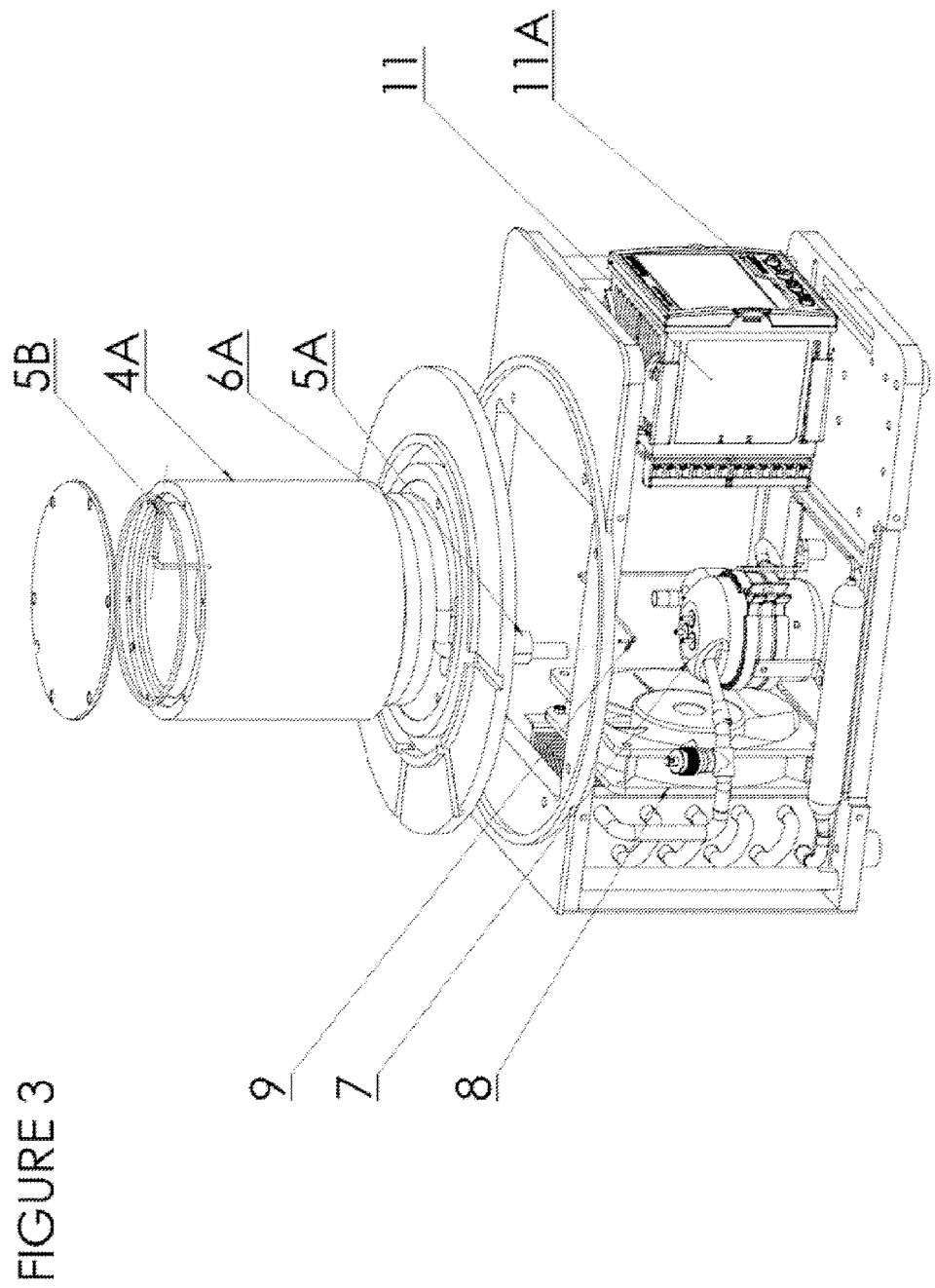
FIG. 3 is a part exploded perspective view of a heating and cooling column.
Figure 4:
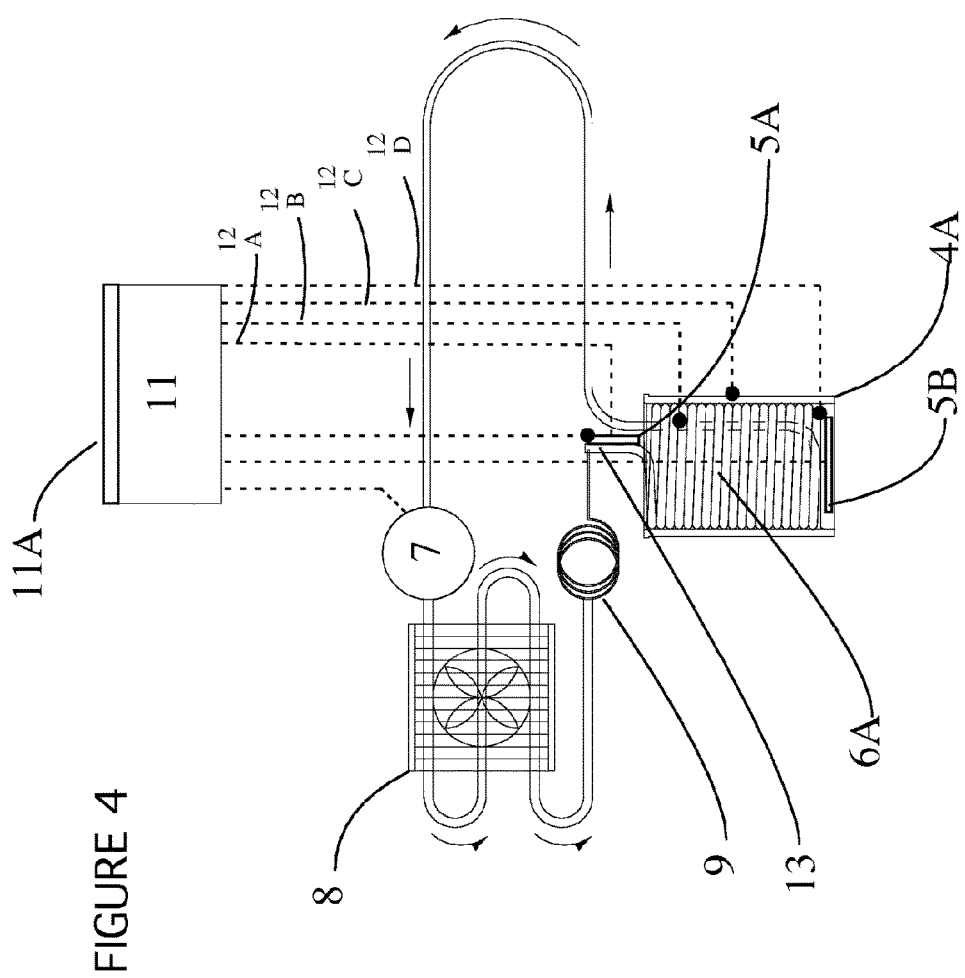
FIG. 4 is a schematic of the heating and cooling column of FIG. 3.

A second embodiment is illustrated in FIGS. 3 & 4 in which like components are given corresponding numbering. The plate 4 is replaced by a cylinder or column 4A and the cooling element 6A is formed as a helix nested so as to run alongside and contact the inner wall of the cylinder 4A. A heating jacket 5A is arranged substantially around a portion of the cooling element 6A at or adjacent the exit of the capillary 9 in order to heat refrigerant as it enters the cooling element 6A.

This embodiment also comprises a second heater element 5B which is arranged within the cylinder substantially at one end thereof (in this case the top end).

In use a conduit (not shown) for carrying a fluid to be heated or cooled is positioned (e.g. wrapped) around the outer surface of cylinder 4A. The temperature of the outer surface of the cylinder 4A is controlled and varied as before by adjusting the power to the compressor 7 and/or heating element 5A; this is controlled by the control unit 11. Heating element 5B can be used where it is desired to provide a temperature profile across the height of the cylinder 4A; when in operation the upper portion will be heated by the heater 5B, whilst the lower portion will remain cooled by cooling element 6B. Varying the power to heating elements 5A, 5B and compressor 7 can be used to vary the temperature profile across the height of the cylinder 4A.

Figure 5:
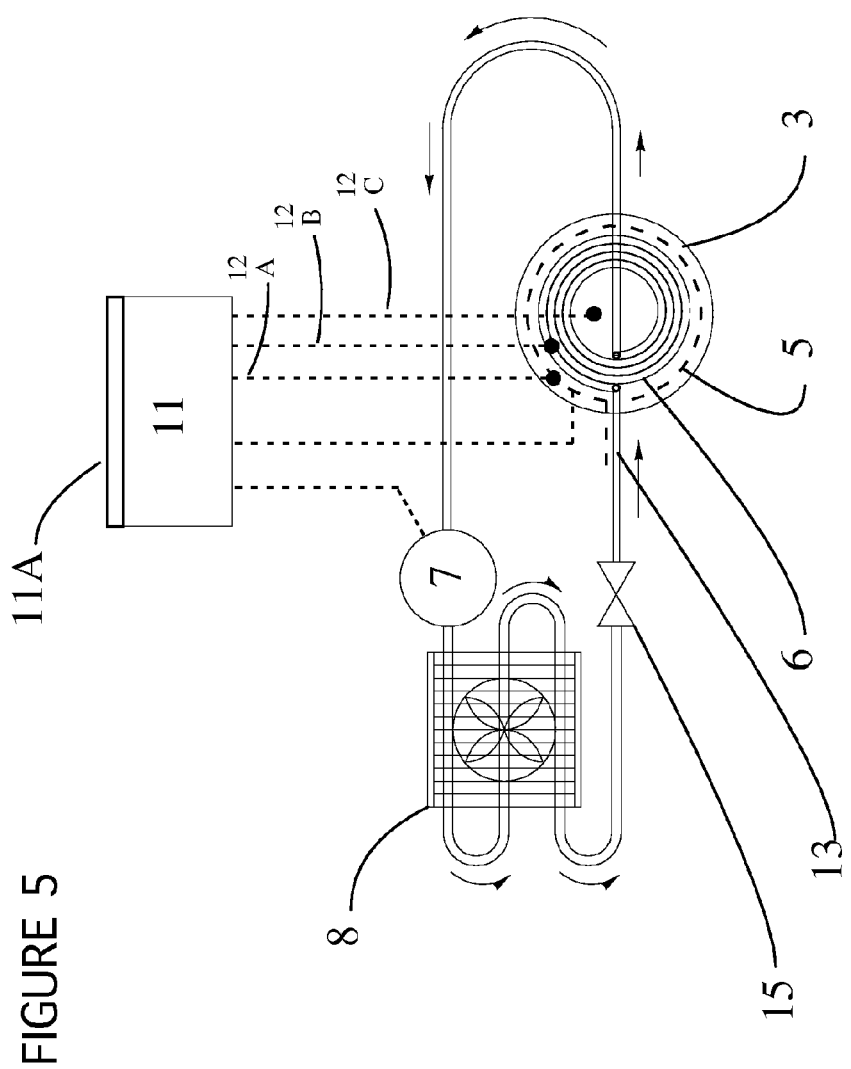
FIG. 5 is a schematic illustrating an alternative embodiment of a heating and cooling plate in which the capillary is replaced with a variable valve.

FIG. 5 illustrates an alternative embodiment which is identical to FIG. 2 other than the capillary 9 is replaced by a variable valve 15. This may be opened and closed if necessary to further control the rate of refrigerant flow through the system.

Similarly a variable valve may be used in place of the capillary 9 in the embodiment of FIG. 3. In a further embodiment not shown, the control unit 11 may be arranged to control the variable valve 15 instead of the compressor 7. In one method, control of the variable valve is achieved using a fixed voltage and a control signal from control unit 11.

Figure 6:
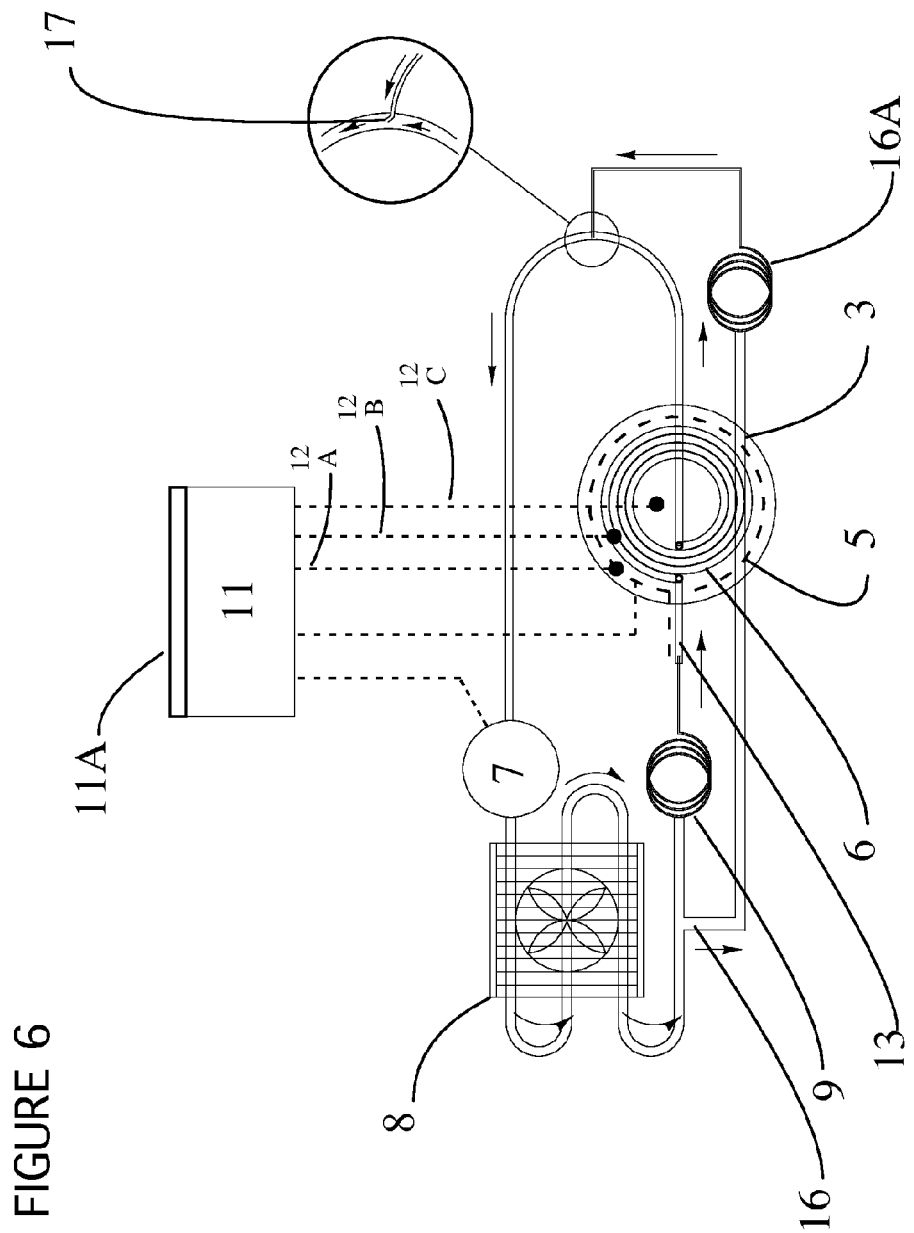
FIG. 6 is a schematic illustrating a further embodiment of a heating and cooling plate comprising a bypass line for refrigerant in order to lower the temperature of refrigerant entering the compressor.

FIG. 6 illustrates a further alternative embodiment provided with a by-pass line 16 which incorporates a capillary or variable valve 16A. The function of the by-pass line is to divert a portion of liquid refrigerant passed the refrigeration element 6, and to reintroduce the liquid refrigerant into the conduit between the cooling element 6 and the compressor 7. Once exiting the capillary 16A the refrigerant evaporates thereby reducing the temperature of refrigerant flowing to the compressor 7. This feature is thought to be of use when refrigerant in the cooling element may be heated to a temperature that could damage the compressor 7. This may occur when the refrigeration system is being used to cool down the plate from a high temperature.

Figure 7:
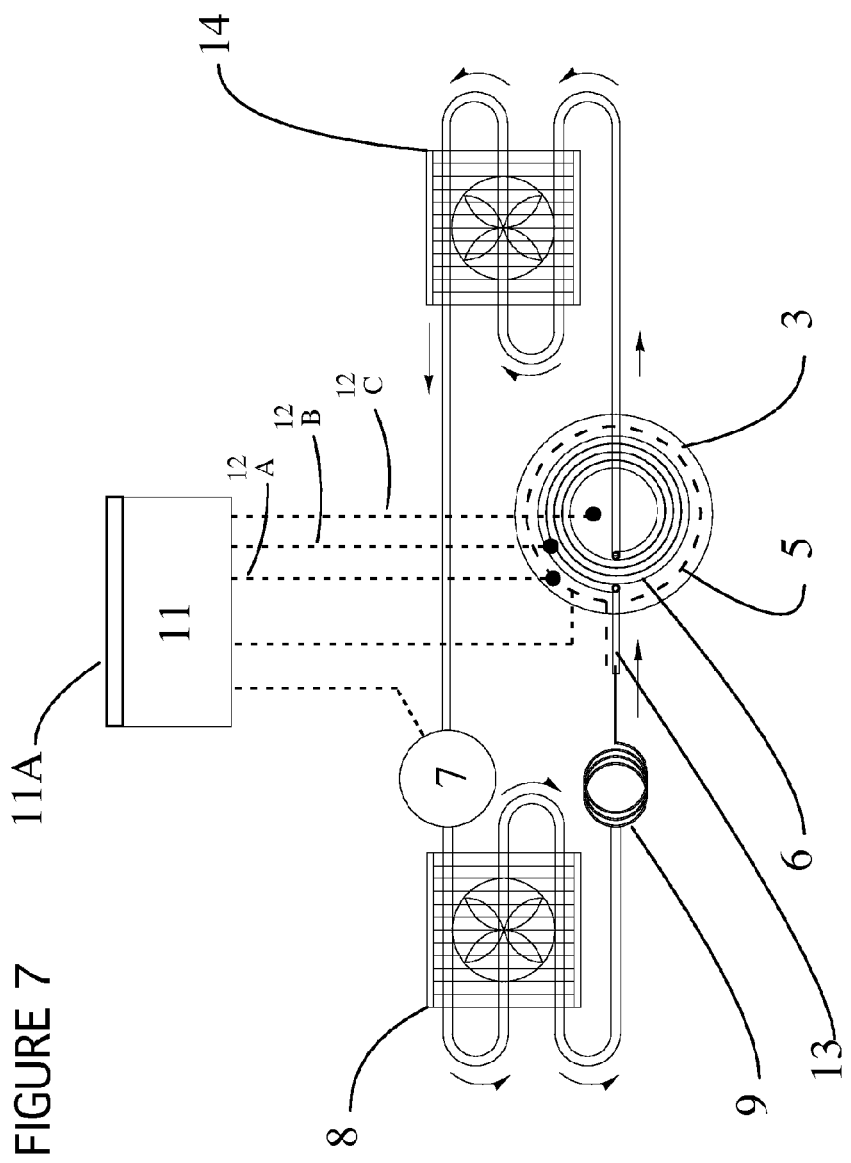
FIG. 7 is a schematic illustrating a further embodiment in which the system comprises a heat exchanger downstream of the evaporator in order to lower the temperature of refrigerant before it enters the compressor.

FIG. 7 illustrates a further alternative in which the temperature of refrigerant flowing to the compressor is cooled by passing it through a second heat exchanger 14 subsequent to flowing through the refrigeration element 6.

Other variations to the above examples are envisaged which fall within the scope of the appended claims. For example, the support and housing for the heating element and refrigeration element may take forms other than cylindrical.

The refrigeration element may be shaped other than as a coil. The heating element make be shaped other than arcuate so long as it is arranged to run alongside a portion of the refrigeration element.

Although the heating element and refrigeration elements are shown as tubes with substantially circular cross sections, the element may be formed such that a portion of the surface in contact with the plate 4 and or heating element 5 is planar or flattened. This enables a larger contact area with the surface than an element with a generally circular cross section.

The surface may be provided by forms other than a plate or cylinder, including but not limited to cuboidal, prism shaped and ovoid.

The apparatus may comprise multiple closed looped vapor compression refrigeration systems, preferably arranged to work in a cascade in order to achieve lower maximum operating temperatures. The arrangements of cascade systems are well known in the art.

The surface may be formed from a flexible material. For example the surface may be defined from a sheet of flexible material such as silicone, or from a woven or matted material or fibrous material such as glass fiber.

It may be possible to omit one of the temperature sensors associated with either the heating element or the cooling element so long as a good thermal contact exists between them.

Although the present specification may describe components and functions implemented in the embodiments with reference to particular standards and protocols, the disclosure is not limited to such standards and protocols. Each of the standards represent examples of the state of the art. Such standards are from time-to-time superseded by equivalents that may be faster or more efficient, but having essentially the same structures and/or functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

The invention claimed is:

1. A heating and cooling apparatus comprising:
   a body providing a first surface for supporting an object comprising a liquid to be heated or cooled on a first side of the body, and a second surface of the body, opposite the first surface, on an opposite side of the body;
   a heater having an electric heating element to heat the first surface through conduction;
   a vapor compression refrigeration system comprising an evaporator through which a refrigerant flows to cool the first surface;
   one or more temperature sensors to sense the temperature of at least one of the body and the object, and one or more further temperature sensors to sense the temperature of at least one of the heating element and the evaporator, and to output signals indicative of these temperatures;
   a controller configured to receive the output signals and in response thereto to control operation of the heater and refrigeration system together in order to control the temperature of the first surface;
   wherein the heater and evaporator are each located in direct physical contact with the second surface of the body opposite the first surface for supporting the object to be heated or cooled on the first side of the body, the heater and evaporator also being in direct physical contact with each other; and
   wherein the heating and cooling apparatus comprising magnetic stirring apparatus housed under the first surface and operable with a magnetized and/or magnetizable stirring element placed within the liquid to stir the liquid.

2. The apparatus according to claim 1, wherein the controller is configured to operate both the refrigeration system and the heater simultaneously in order to maintain a steady temperature of the first surface and/or control the rate of heating or cooling of the first surface.

3. The apparatus according to claim 1, wherein the heater and evaporator are in contact with one another.

4. The apparatus according to claim 3, comprising a casing into which the heater element and evaporator reside and which provides at least part of a thermal conducting path.

5. The apparatus according to claim 1, wherein, the controller is arranged and configured to vary the speed of a compressor forming part of the vapor compression refrigeration system in order to control the flow of the refrigerant through the evaporator.

6. The apparatus according to claim 5, wherein the compressor is powered by a direct current source, and that the controller is configured to vary the current to the compressor.

7. The apparatus according to claim 1, wherein the first surface is substantially cylindrical.

8. The apparatus according to claim 1, wherein the first surface is substantially planar.

9. A heating and cooling apparatus comprising:
- a body providing a first surface and a second surface opposite the first surface, the first surface for supporting an object comprising a liquid to be heated or cooled on a first side of the body;
- a heater having an electric heating element located in direct physical contact with the second surface of the body to quickly transfer heat to the first surface through conduction;
- a vapor compression refrigeration system comprising an evaporator through which a refrigerant flows, the evaporator located in a direct physical contact with the second surface of the body to quickly transfer heat from the first surface to cool the first surface, the evaporator being further located in a direct physical contact with the heating element to quickly transfer heat from the heating element to the evaporator;
- one or more temperature sensors to sense the temperature of at least one of the body and the object, and one or more further temperature sensors to sense the temperature of at least one of the heating element and the evaporator, and to output signals indicative of these temperatures;
- a controller configured to receive the output signals and in response thereto to control operation of the heater and refrigeration system together in order to control the temperature of the first surface; and
- wherein the heating and cooling apparatus comprising magnetic stirring apparatus housed under the first surface and operable with a magnetized and/or magnetizable stirring element placed within the liquid to stir the liquid.

10. The heating and cooling apparatus of claim 9, wherein the body comprises a plate having the first surface and the second surface opposite the first surface.

* * * * *